M. J. PHILBIN.
NOTE RECORD.
APPLICATION FILED OCT. 23, 1917.

1,277,640.

Patented Sept. 3, 1918.
5 SHEETS—SHEET 1.

FIG. 1.

| MAKER | Nº 5206 | REGISTER OF NOTE DUE |
|---|---|---|
| | | ENDORSEMENT OR COLLATERAL |

| DATE | | TIME | |
|---|---|---|---|
| MONTH | DAY | MONTHS | DAYS |

| AMOUNT | INTEREST | NET PROCEEDS | PURCHASED |
|---|---|---|---|
| PAYABLE AT THIS BANK | | CREDIT LOANS | CREDIT INTEREST |

| MAKER | Nº 5207 | REGISTER OF NOTE DUE |
|---|---|---|
| | | ENDORSEMENT OR COLLATERAL |

| DATE | | TIME | |
|---|---|---|---|
| MONTH | DAY | MONTHS | DAYS |

| AMOUNT | INTEREST | NET PROCEEDS | PURCHASED |
|---|---|---|---|
| PAYABLE AT THIS BANK | | CREDIT LOANS | CREDIT INTEREST |

| MAKER | Nº 5208 | REGISTER OF NOTE DUE |
|---|---|---|
| | | ENDORSEMENT OR COLLATERAL |

| DATE | | TIME | |
|---|---|---|---|
| MONTH | DAY | MONTHS | DAYS |

| AMOUNT | INTEREST | NET PROCEEDS | PURCHASED |
|---|---|---|---|
| PAYABLE AT THIS BANK | | CREDIT LOANS | CREDIT INTEREST |

INVENTOR
M. J. Philbin
BY
Denison Thompson
ATTORNEY

M. J. PHILBIN.
NOTE RECORD.
APPLICATION FILED OCT. 23, 1917.

1,277,640.

Patented Sept. 3, 1918.
5 SHEETS—SHEET 2.

FIG. 2

No. 5206 — NOTICE OF NOTE DUE — ENDORSEMENT OR COLLATERAL

Notes bearing any change or alteration can not be accepted. Checks must be certified when offered in payment of notes.
To save protest all notes must receive attention on or before the due date.
The date in the upper corner is the last day.
CENTRAL TRUST COMPANY, Altoona, Pa.
J. Doe, Treas.

No. 5207 — NOTICE OF NOTE DUE — ENDORSEMENT OR COLLATERAL

Notes bearing any change or alteration can not be accepted. Checks must be certified when offered in payment of notes.
To save protest all notes must receive attention on or before the due date.
The date in the upper corner is the last day.
CENTRAL TRUST COMPANY, Altoona, Pa.
J. Doe, Treas.

No. 5208 — NOTICE OF NOTE DUE — ENDORSEMENT OR COLLATERAL

Notes bearing any change or alteration can not be accepted. Checks must be certified when offered in payment of notes.
To save protest all notes must receive attention on or before the due date.
The date in the upper corner is the last day.
CENTRAL TRUST COMPANY, Altoona, Pa.
J. Doe, Treas.

INVENTOR
M. J. Philbin
BY Linion Thompson
ATTORNEY

M. J. PHILBIN.
NOTE RECORD.
APPLICATION FILED OCT. 23, 1917.

1,277,640.

Patented Sept. 3, 1918.
5 SHEETS—SHEET 3.

FIG. 3.

M. J. PHILBIN.
NOTE RECORD.
APPLICATION FILED OCT. 23, 1917.

1,277,640.

Patented Sept. 3, 1918.
5 SHEETS—SHEET 4.

FIG. 4.

M. J. PHILBIN.
NOTE RECORD.
APPLICATION FILED OCT. 23, 1917.

1,277,640.

Patented Sept. 3, 1918.
5 SHEETS—SHEET 5.

INVENTOR
M. J. Philbin
BY Denison Thompson
ATTORNEY

UNITED STATES PATENT OFFICE.

MATTHEW J. PHILBIN, OF OLYPHANT, PENNSYLVANIA.

NOTE-RECORD.

1,277,640.

Specification of Letters Patent.

Patented Sept. 3, 1918.

Application filed October 23, 1917. Serial No. 198,015.

*To all whom it may concern:*

Be it known that I, MATTHEW J. PHILBIN, a citizen of the United States, and resident of Olyphant, in the county of Lackawanna, in the State of Pennsylvania, have invented new and useful Improvements in Note-Records, of which the following, taken in connection with the accompanying drawings, is a full, clear, and exact description.

This invention relates to certain improvements in note records, for use in banks and other places where it is necessary or desirable to keep a record of all current notes and information pertaining thereto held by or passing through such bank or similar institution, and reference is hereby made to Letters Patent No. 1,189,286, issued to me under date of July 4, 1916.

The main object of my present invention is to provide a ready reference record for bank notes in which all of the information relating to any bank note may be entered at one writing and the records filed under their respective captions or headings to constitute a convenient and ready reference for subsequent use. In other words, I have sought to provide a "liability card ledger" in which the cards of each set for a particular note bear the same number, and in many respects the same record, but are filed under their proper headings and constitute a current record that is positively accurate without additional labor except as to filing of the cards, in some instances according to due date and in other instances alphabetically.

For the purpose of facilitating the use and filing of these card records, I utilize a series of sheets of preferably substantially the same size and form and secured together at one end, each sheet comprising a series of cards or blank forms numbered consecutively and adapted for recording the same record as applied to different notes.

Preferably I utilize five sheets, each comprising a series of cards, the cards on the respective sheets being designated as "register," "notice," "tickler," "indorser," and "maker." These sheets may be arranged in any desired order, and in the commercial embodiment of this invention I have elected to arrange them with the register sheet first, the notice sheet second, the tickler sheet third, the indorser sheet fourth, and the maker sheet fifth. Other arrangements, however, may be made as desired.

In the specific illustration of the invention as here shown, each sheet comprises three cards. In other words, the first sheet comprises three register cards of like form and consecutively numbered, the second sheet three notice cards of like form and consecutively numbered, the third sheet three tickler cards of like form and consecutively numbered, the fourth sheet three indorser cards of like form and consecutively numbered, and the fifth sheet three maker cards of like form and consecutively numbered, the register, notice, tickler, indorser and maker cards of like number being superposed one upon the other with like spaces, as hereinafter set forth, in registration so that the matter produced in the spaces of the front card, in this instance the register card, may be reproduced in like spaces of the remaining cards at one writing merely by the interposition of transfer medium, as carbon paper, between the cards.

In the drawings—

Figure 1 is a plan view of my note record in which the front sheet, in this instance the register sheet, alone appears, such sheet embodying three register cards integrally united so that the cards are not adapted to be separated but are to be filed in unison as a continuous sheet when this sheet is separated from the remaining sheets.

Fig. 2 shows the same article with the front or register sheet removed.

Fig. 3 shows the same article with the register and notice sheets removed.

Fig. 4 illustrates the same article with the register, notice and tickler cards removed.

Fig. 5 illustrates the same article with the register, notice, tickler and indorser cards removed.

Fig. 6 is a cross section on line 6—6, Fig. 1, showing one method of securing the sheets together at their upper ends.

The registration sheet, as shown and as heretofore stated, in this specific illustration embodies three distinct cards or forms for records, consecutively numbered for the entry of like matter constituting a record of different notes. In my commercial embodiment of this invention, I have preferably embodied five register cards upon a single sheet, but it will be readily apparent that the number of cards formed on a continuous sheet may be varied without departing from the spirit of this invention, so long as a plurality of cards are formed of the same sheet.

The sheet —1— appearing in Fig. 1 is of a continuous nature and unperforated except along the line marked —2—, which permits the separation of the entire first sheet containing the register matter from the remaining sheets. Otherwise the front sheet is unperforated and no portions thereof are weakened to permit separation of such parts from the remaining parts, but rather this entire sheet is adapted to be filed in a suitable book to constitute an original bank record. In order to do away with or destroy the original bank record of one note, it is necessary, under this construction, to do away with or destroy the record, as shown, of three notes; in actual practice as used, of five notes.

The sheet may, as shown, be provided with openings —3— for the reception of posts of the usual binders. It will be noted that a considerable space is provided at the left of the cards to permit such binding without concealing any of the record matter upon the cards.

The second sheet, numbered —10— and shown in Fig. 2, is, as heretofore stated, formed with three notice cards, the entire sheet being perforated or weakened along line —4— to permit separation of the entire sheet from the remaining sheets if desired. Likewise the sheet is perforated or weakened along lines —5— and —6— permitting the easy separation of the notice cards from each other so that they may be filed separately in accordance with the maturity date of the note. The sheet is also preferably perforated or weakened along line —7— to permit separation of the cards from the marginal portion —8— corresponding to the marginal portion —9— of Fig. 1 provided for permitting the easy filing of the series of register cards as a continuous sheet without obstructing the view of the record matter contained thereon.

Figure 3:
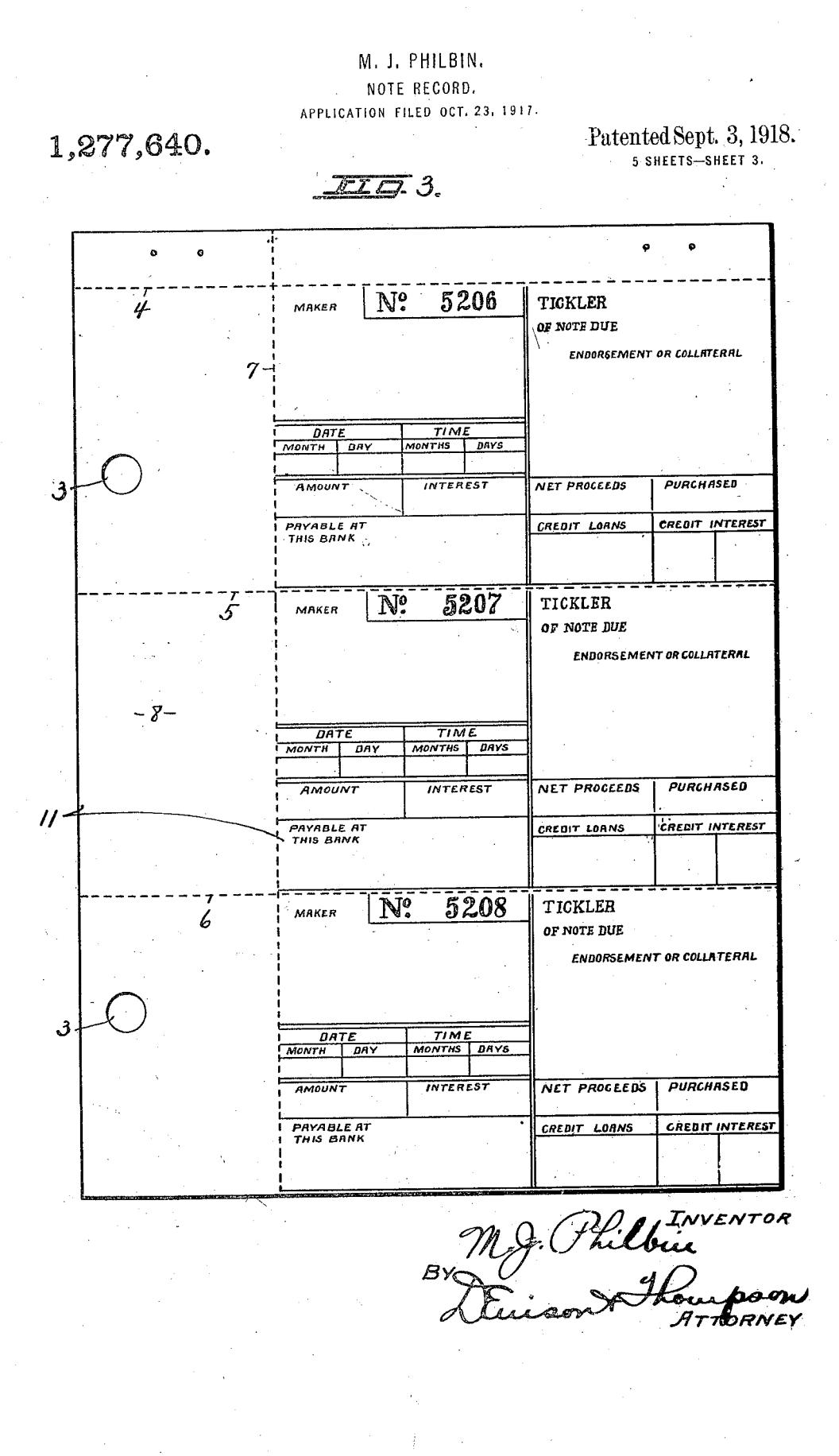
Figure 4:
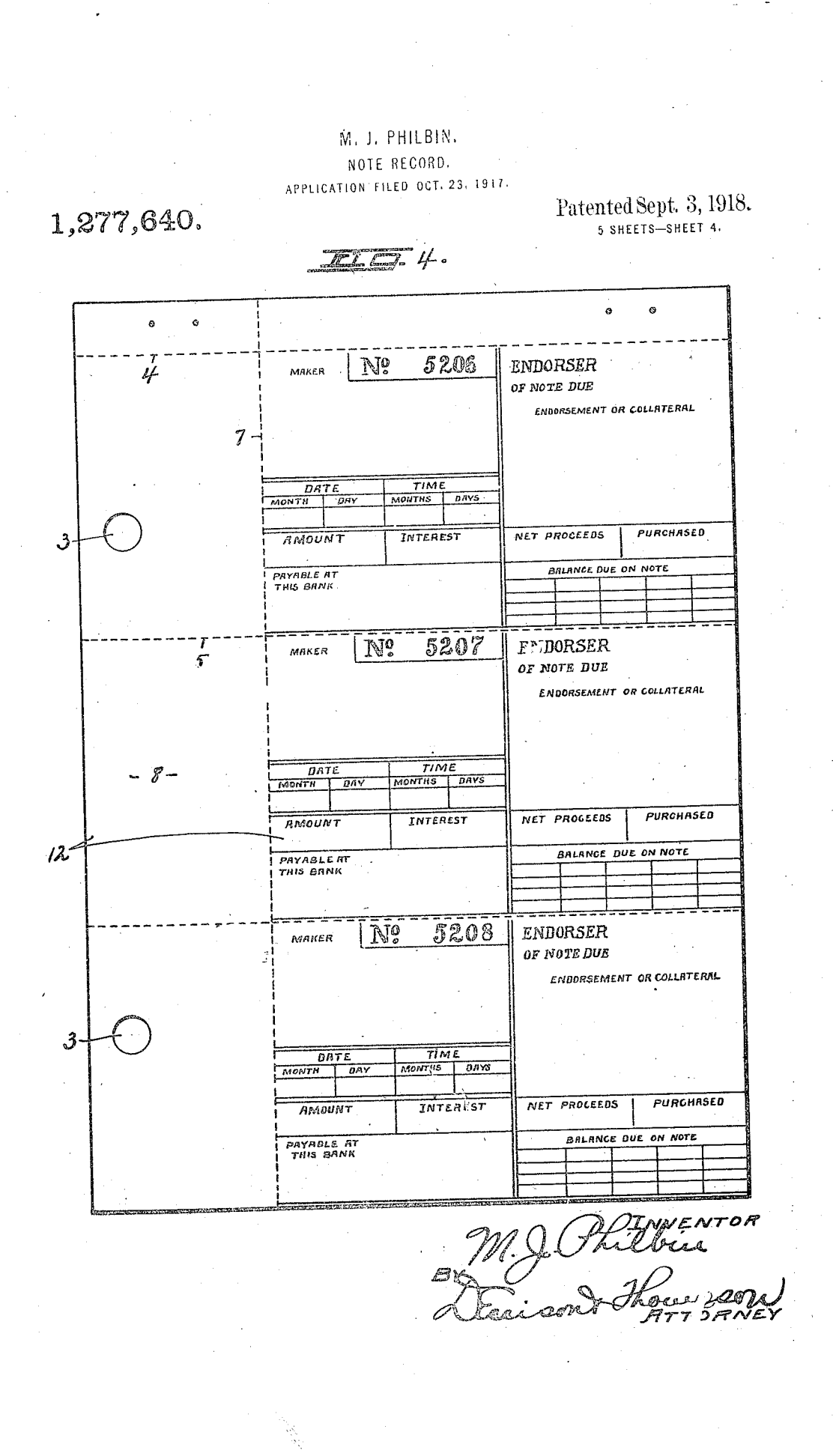

The tickler, indorser and maker cards, numbered respectively —11—, —12— and —13— and shown in Figs. 3, 4 and 5 respectively, are provided with perforated lines or weakened portions similar to and which I have numbered the same as the lines —4—, —5—, —6— and —7— upon the notice card, and with the marginal space —8— as described, all to permit the separation and filing of the tickler, indorser and maker records as individual cards separate from the series of cards in connection with which they are combined in the article as manufactured and sold.

The register, notice, tickler, indorser and maker cards all contain spaces properly designated, in this instance by the same expression or identifying term, for the reception of the same subject-matter constituting a complete record of any given note. Each of these cards contains a space for receiving the name of the maker of the note, the date of the note, the time of the note, the amount of the note, the interest or discount on the note, the due date of the note, the indorsement or collateral in connection with the note, and the bank or place at which the note is payable.

In addition to this, the register, tickler, indorser and maker cards contain spaces designated to receive the net proceeds of the note and the time of purchase of the note. The space upon the notice card registered with these spaces to receive net proceeds and purchase date is so colored that the subject-matter produced upon the other cards will not appear upon the notice card, as there is no necessity of giving the maker of the note the information as to when the bank purchased the note or the amount that it paid for the same, as the date might tend to confuse the maker of the note as to the time when the same should be due.

As shown, the register card and tickler card contain spaces properly designated to receive credit loans and credit interest. This matter need not be produced upon the register card, but its production upon the tickler card is preferable as under such circumstances the tickler card performs a function additional to and after its use as a tickler card has ceased.

The indorser and maker cards contain a space or spaces properly designated to receive a record of the amount that may remain due upon a note or to indicate payments on the note whereby the balance due on the note will appear.

As before stated, each card is consecutively numbered. The register, notice, tickler, indorser and maker cards constituting a complete card set for recording all subject-matter in connection with any note have the same number and the successive cards upon each sheet are preferably consecutively numbered.

It will be understood that the word "interest" as used upon the cards hereof is equivalent to the word "discount" for the purposes of this application, the word "discount" being used by banks to indicate the same thing as the word "interest" when used by trust companies.

The sheets numbered —1—, —11—, —12— and —13— are preferably formed of material such as paper and of different color so that the color of the card itself indicates the nature of the record contained thereon. In the commercial embodiment of this invention, the register card is light yellow, the tickler card is pink, the indorser card is deep yellow or golden, and the maker card is white. The color of the notice card is not important, as that is not a part of the bank record and may also be white.

For instance, the maker and indorser cards are filed alphabetically. The bank clerk goes to the file of Mr. John Jones and finds three white cards and two deep yellow cards, and he immediately knows that Mr. Jones is the maker of three notes and the indorser upon two notes, and for this reason in addition to the accuracy and ease with which the cards are filed, the different colorings of the sheets are important. The colorings of the sheets may, of course, be varied in accordance with any desired plan and arrangement, the object of the invention being effected by a series of sheets as described which are of different color.

It will be readily apparent that although I have shown and described a notice card in combination with the other cards as perhaps the preferred embodiment of my invention, the use of such card is not essential as the bank record is complete without such "notice" card, the same being merely for the convenience of the bank in notifying the maker of the note that the same is due, and the said "notice" card may, therefore, be omitted without departing from the scope of this invention as set forth in the appended claims. And, while I have chosen to place specific designations upon the cards, as "register," "tickler," "indorser," "maker," "notice," other and equivalent indicating designations or indicia may be used, and various and equivalent notations may be substituted for any or all of the notations upon the cards, the particular subject-matter which I desire to claim in this application relating specifically to the mechanical construction of the article of manufacture herein disclosed in which the register cards are formed in a continuous sheet comprising a plurality of such cards, such sheet adapted to be filed as a unitary article to constitute an original bank record, while the remaining sheets containing equivalent numbers of cards designated respectively, as heretofore set forth, have suitable perforated or weakened portions to permit the ready separation of each card from the remaining cards of its particular sheet so that the cards may be filed separately and independently of each other in accordance with different due dates and different names as alphabetically classified.

Preferably all of the sheets are, as originally furnished, secured together so that similar spaces are held in exact registration, the sheets being provided with suitable perforated lines or weakened portions to permit separation of each sheet from the portions of the sheets which are bound or permanently secured together.

What I claim is:—

1. A note record composed of sheets, each sheet comprising a plurality of cards, the cards on one sheet being designated as register, the cards on another set being designated as tickler, the cards on another sheet being designated as indorser, and the cards on another sheet being designated as maker, the sheet comprising the register cards being continuous and unperforated and adapted to be filed as a unit to constitute an original bank record, the sheets comprising the tickler, indorser and maker cards being perforated to permit the separation of each card from the other cards so that each tickler card can be independently filed in accordance with the due date of a note and each maker and indorser card may be independently and alphabetically filed in accordance with the name of the indorser and maker, respectively.

2. A note record composed of sheets, each sheet comprising a plurality of cards and a margin extending across the ends of all the cards of that sheet, the cards on one sheet being designated as register, the cards on another sheet being designated as tickler, the cards on another sheet being designated as indorser, and the cards on another sheet being designated as maker, the sheet comprising the register cards being continuous and unperforated and adapted to be filed as a unit to constitute an original bank record, the sheets comprising the tickler, indorser and maker cards being perforated to permit the separation of each card from the other cards so that each tickler card can be independently filed in accordance with the due date of a note and each maker and indorser card may be independently and alphabetically filed in accordance with the name of the indorser and maker, respectively.

3. A note record composed of sheets, each sheet comprising a plurality of cards, the cards on one sheet being designated as register, the cards on another sheet being designated as tickler, the cards on another sheet being designated as indorser, and the cards on another sheet being designated as maker, each register, tickler, indorser and maker card provided with spaces designated to receive the name of the maker, the indorser, and the due date of a note, each of said spaces on one of said cards being over the corresponding space on the other of said cards for the interposition of a transfer medium, the sheet comprising the register cards being continuous and unperforated and adapted to be filed as a unit to constitute an original bank record, the sheets comprising the tickler, indorser and maker cards being perforated to permit the separation of each card from the other cards so that each tickler card can be independently filed in accordance with the due date of a note and each maker and indorser card may be independently and alphabetically filed in accordance with the name of the indorser and maker, respectively.

4. A note record composed of sheets, each sheet comprising a plurality of cards, the cards on one sheet being designated as register, the cards on another sheet being designated as notice, the cards on another sheet being designated as tickler, the cards on another sheet being designated as indorser, and the cards on another sheet being designated as maker, the sheet comprising the register cards being continuous and unperforated and adapted to be filed as a unit to constitute an original bank record, the sheets comprising the tickler, indorser and maker cards being perforated to permit the separation of each card from the other cards so that each notice card may be independently filed in accordance with the maturity of the note and each tickler card may be independently filed in accordance with the due date of a note, and each maker and indorser card may be independently and alphabetically filed in accordance with the name of the indorser and maker, respectively.

5. A note record composed of sheets, each sheet comprising a plurality of cards, the cards on one sheet being designated as register, the cards on another sheet being designated as tickler, the cards on another sheet being designated as indorser, and the cards on another sheet being designated as maker, each of said cards provided with spaces designated to receive the name of the maker, the indorser, the due date, the time, the amount, and the date of a note, each of said spaces on one of said cards being over the corresponding spaces on the other cards for the interposition of a transfer medium, the sheet comprising the register cards being continuous and unperforated and adapted to be filed as a unit to constitute an original bank record, the sheets comprising the tickler, indorser and maker cards being perforated to permit the separation of each card from the other cards so that each tickler card may be independently filed in accordance with the due date of a note and each maker and indorser card may be independently and alphabetically filed in accordance with the name of the indorser and maker, respectively.

6. A note record composed of sheets of different colors, each sheet comprising a plurality of cards, the cards on one sheet being designated as register, the cards on another sheet being designated as tickler, the cards on another sheet being designated as indorser, and the cards on another sheet being designated as maker, the sheet comprising the register cards being continuous and unperforated and adapted to be filed as a unit to constitute an original bank record, the sheets comprising the tickler, indorser and maker cards being perforated to permit the separation of each card from the other cards so that each tickler card may be independently filed in accordance with the due date of a note and each maker and indorser card may be independently and alphabetically filed in accordance with the name of the indorser and maker, respectively.

In witness whereof I have hereunto set my hand this 19th day of October, 1917.

MATTHEW J. PHILBIN.

Witnesses:
WALTER TINSLEY,
DAN. G. JONES.